United States Patent
Lee et al.

(10) Patent No.: US 10,954,435 B2
(45) Date of Patent: Mar. 23, 2021

(54) LUMINESCENT RARE EARTH ELEMENT COMPOUND AND DICHROIC PHOSPHOR COMPOSITION CONTAINING SAME

(71) Applicant: NANO CMS CO., LTD., Cheonan-si (KR)

(72) Inventors: In Ja Lee, Cheonan-si (KR); Je Young Park, Seoul (KR); Shi Surk Kim, Cheonan-si (KR)

(73) Assignee: NANO CMS CO., LTD., Cheonan-si (KR)

( * ) Notice: Subject to any disclaimer, the term of this patent is extended or adjusted under 35 U.S.C. 154(b) by 565 days.

(21) Appl. No.: 15/505,878

(22) PCT Filed: Oct. 13, 2014

(86) PCT No.: PCT/KR2014/009560
§ 371 (c)(1),
(2) Date: Feb. 22, 2017

(87) PCT Pub. No.: WO2016/027924
PCT Pub. Date: Feb. 25, 2016

(65) Prior Publication Data
US 2018/0215999 A1 Aug. 2, 2018

(30) Foreign Application Priority Data
Aug. 22, 2014 (KR) .................. 10-2014-0109434

(51) Int. Cl.
C09K 11/06 (2006.01)
C09K 11/77 (2006.01)
C09D 11/50 (2014.01)

(52) U.S. Cl.
CPC .............. *C09K 11/06* (2013.01); *C09K 11/77* (2013.01); *C09K 2211/182* (2013.01)

(58) Field of Classification Search
CPC ... C09K 11/06; C09K 11/77; C09K 2211/182; C09D 11/50
USPC .................................................... 252/301.16
See application file for complete search history.

(56) References Cited

U.S. PATENT DOCUMENTS

| | | | | |
|---|---|---|---|---|
| 4,572,803 A * | 2/1986 | Yamazoe | .............. | C09K 11/06 252/301.16 |
| 2007/0134160 A1* | 6/2007 | Leif | .................. | G01N 21/6428 424/9.6 |
| 2014/0127677 A1* | 5/2014 | Correa, Jr. | .......... | C12Q 1/6806 435/6.1 |

FOREIGN PATENT DOCUMENTS

KR  101212944  12/2012

OTHER PUBLICATIONS

Su et al., "New, rapid fluorescence stain method for histological sections using lanthanide complexes", Analytical Biochemistry, 347, pp. 89-93. (Year: 2005).*
Ma et al. "Synthesis and fluorescence properties of ten lanthanide benzene-1,3,5-tricarboxylate complexes", 2010, Spectrochimica Acta Part A 77, pp. 419-423. (Year: 2010).*
Rao et al., "Thermodynamic study of Eu(III) complexation by pyridine monocarboxylates", 2012, J. Chem. Thermodynamics, 55, pp. 67-74. (Year: 2012).*
Yang et al., "Spectral Study of the Co-luminescence Effect of Lanthanide Ternary Complexes with Benzoic Acid and Phenanthroline", 2004, Spectroscopy Letters, vol. 37, abstract only, pp. 1-2. (Year: 2004).*
Yang et al., "Synthesis and Characterization of the Eu(Gd,Y)-trimesic Acid Complexes", 2008, Journal of Hebei Normal University (Natural Science Edition), abstract only, pp. 1-3. (Year: 2008).*
Machine translation of KR101212944, 2012, 12 pages. (Year: 2012).*
PCT International Application No. PCT/KR2014/009560, Notification of Transmittal of the International Search Report and the Written Opinion of the International Searching Authority, or Declaration dated May 20, 2015, 11 pages.
European Patent Office Application Serial No. 14899982.4, Search Report dated Feb. 22, 2018, 9 pages.
European Patent Office Application Serial No. 14899982.4, Office Action dated Sep. 23, 2019, 4 pages.
Ma, R. et al., "Synthesis and Fluorescence properties of ten lanthanide benzene-1, 3, 5-tricarboxylate complexes", Spectrochimica Acta Part A: Molecular and Biomolecular Spectroscopy, vol. 77 (2010), Issue 2, pp. 419-423, 6 pages.

(Continued)

*Primary Examiner* — Matthew E. Hoban
*Assistant Examiner* — Lynne Edmondson
(74) *Attorney, Agent, or Firm* — Lee, Hong, Degerman, Kang & Waimey

(57) ABSTRACT

The present invention relates to a luminescent rare earth compound and dichroism fluorescent composition thereof, and more particularly, the luminescent rare earth compound is a luminescent rare earth compound excited by shortwave UV (Ultra-Violet).

The luminescent rare earth compound and/or products applied with the luminescent rare earth compound according to the present invention can emit strong red and green colors by being excited at 240-330 nm range of wavelengths, while not being excited at 360-380 nm range of wavelengths, and showing no colors under visible light.

Furthermore, the compound may be variably utilized to printed materials and plastic mold products because of possessing high heat resistance, high light resistance and high dispersibility of medium light. In addition, compositions emitting respectively different colors at mutually different wavelength ranges can be provided by mixing the luminescent rare earth compound according to the present invention with other excited luminescent compounds.

6 Claims, No Drawings

(56) References Cited

OTHER PUBLICATIONS

Chemical Abstract, Accession No. 158:610922 Synthesis of Eu(III) complex with trimesic acid ligand and its fluorescence properties, May 2013, 2 pages.
Chemical Abstract, Accession No. 153:345394, Synthesis and fluorescence characteristics of Eu—Tb complexes with trimesic acid, Sep. 2010, 2 pages.
Zolin, V. et al., "Charge transfer bands in the luminescence excitation spectra of isomeric pyridinedicarboxylic salts of europium", Journal of Alloys and Compounds, vol. 341, No. 1-2, pp. 376-380, Jul. 2002, 2 pages.
Fan, X. et al., "The in situ synthesis process and luminescence behavior of 2-pyridinecarboxylic acid europium complexes in the sol-gel derived host materials", Materials Chemistry and Physics, vol. 82, No. 1, pp. 38-43, Sep. 2003, 2 pages.

\* cited by examiner

LUMINESCENT RARE EARTH ELEMENT COMPOUND AND DICHROIC PHOSPHOR COMPOSITION CONTAINING SAME

CROSS-REFERENCE TO RELATED APPLICATIONS

This application is the National Stage filing under 35 U.S.C. 371 of International Application No. PCT/KR2014/009560, filed on Oct. 13, 2014, which claims the benefit of earlier filing date and right of priority to Korean Application No. 10-2014-0109434, filed on Aug. 22, 2014, the contents of which are all hereby incorporated by reference herein in their entirety.

TECHNICAL FIELD

The teachings in accordance with exemplary embodiments of this invention relate generally to a luminescent rare earth compound and dichroism fluorescent composition, and more particularly, the luminescent rare earth compound is a luminescent rare earth compound excited by shortwave UV (Ultra-Violet).

BACKGROUND ART

The present invention relates to a luminescent rare earth complex compound excited by narrow band UV. This compound generally emits strong red and blue visible ray wavelengths excited by UV light source of 240 nm-330 nm wavelength range.

Although the compound and mixtures thereof according to the present invention is colorless under reaction of daylight, when UV is excited, fluorescence appears in different colors in response to coupled state of metal ions and ligand. This UV complex compound may be widely employed for industry and bank security using luminous characteristics. The conventional luminous materials used for security feature in industry and bank fields were excited by near ultraviolet rays of 360 nm~380 nm wavelength range.

The present invention is thus provided to satisfy needs of bank markets requiring a higher level of security and distinguishing from the conventional luminescent materials. In order to apply same to security-needed products, the luminescence characteristics can be demonstrated from coating and plastic molding only when luminous efficiency of complex compound is high, and heat resistance, light resistance and dispersibility are high as well.

Thus, although inorganic fluorescent substances show a high luminance at narrow band, the luminance characteristics abruptly decrease due to broken crystals during ink manufacturing. The lanthanides ionic compound may be widely applied to various fields such as fluorescent marks and fluorescence analyzing OLEDs due to long luminescence (light emitting) time, strong light emission and long Strokes' shift and narrow luminescence.

The electronic structure of rare earth ion (Ln3+) is relatively and effectively shielded by 5S2 and 5P6, which are outer orbital functions, such that there is no covalent bond, and only electrostatic bond becomes available in response to interaction between surrounding negative ions and dipolar molecules. The energy level of 4fb electronic shell of rare earth metal has the same parity, such that transition between 4fn-4fn is prohibited. On the contrary, due to mixture with odd-parity wavelength function, 4fn-4fn-15d1 transition or charge transfer (4fn-4fn-15L1, L=ligand) occurs, and partially changed to admissible state. Thus, a radiant cross-sectional area of absorption and luminescence is small on a solid state, and as a result, the luminescence time is very long as much as to a level of ms to thereby generate a luminescence of a narrow line width. Furthermore, this transition is very sensitive to environment of ligand coordinated about lanthanoids ions to generally demonstrate a characteristic of very strong absorption transition or emission transition when meeting with complex ligand over a simple coordination environment (See "Rare earth coordination chemistry: Fundamentals and Application, CHUN-HUI HUANG, Wiley, 2010").

Thus, in order to design a rare earth compound having excellent characteristics of high luminescence and durability, it is important to perform a research related on the ligand. The major ligands include cryptands, calixarenes, β-diketones, macrocyclic ligands, carboxylic acid derivatives, heterobiary ligand (See "Europium: Compounds, production and Application", Lucia M., Nova Science Publishers, Inc., New York, 2009").

This compound produces a strong luminescence due to antenna effect where strong absorption is generated from ligand, and energy effectively moves from ligand to central metal. Among these ligands, the europium-β-diketonate complex has received many researches, where the excited wavelength or energy transfer efficiency is influenced by substituents added to skeleton of β-diketonate complex. That is, the responded luminescence intensity of β-diketonate complex is greatly influenced by various substituents such as methyl, trifluoromethyl, phenyl, thiophenyl, poly aromatic monomer. Red fluorescent ink complex applied with europium-diketonate complex is known from U.S. Pat. No. 6,486,350 B2 and U.S. Pat. No. 7,108,742 B2. Although these complexes all emit a strong red color in solid and liquid phases, these complexes suffer from disadvantages of high solubility relative to solvent, low light stability and low heat stability. Most of these complexes showed luminescence characteristic when irradiated in near ultraviolet ray wavelength range of 360 nm-380 nm, and showed no luminescence characteristic when irradiated in near ultraviolet ray wavelength range of 240 nm~330 nm.

INVENTION

Technical Problem

The present invention is provided to solve the aforementioned disadvantages/problems, and therefore, an exemplary embodiment of the present invention is to provide a luminescent rare earth compound which showed luminescence characteristic when irradiated in near ultraviolet ray wavelength range of 360 nm~380 nm, and showed no luminescence characteristic when irradiated in near ultraviolet ray wavelength range of 240 nm~330 nm, and which can possess high heat resistance, high light resistance and high dispersibility in medium light, and dichroism fluorescent composition thereof.

Technical Solution

According to a general aspect and an exemplary embodiment of the present invention, there is provided a luminescent rare earth compound having a structure of the following chemical formula I,

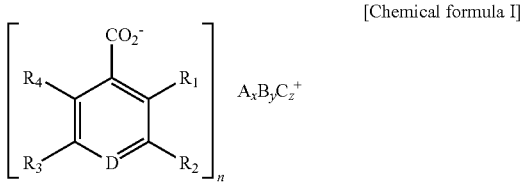

[Chemical formula I]

where, A and B are rare earth metals independently selected from Ce, Pr, Nd, Sm, Eu, Gd, Tb, Dy, Ho, Er and Tm, C is an amphoteric element selected from Al, Ga and In, each of R 1, R 2 and R 3 is independently carboxylate anion or H, and D is a nitrogen or carbon.

In some exemplary embodiments, R 1 and R 4 are H, R 2 and R 3 are carboxylate anion, D is carbon and A and B may be selected from Eu and Tb.

In some exemplary embodiments, the chemical formula I may satisfy the stoichiometry of n: $x+y+z=3/$[the number of negative electric charge in above chemical formula I]: 1.

In some exemplary embodiments, the compound may not be excited at a wavelength of 360-380 nm range and may be excited at a wavelength of 240-330 nm range.

In some exemplary embodiments, the compound may emit red and green colors.

In another general aspect of the present invention, there is provided a dichroism fluorescent composition comprising: the luminescent rare earth compound having a structure of the following chemical formula II and including near ultraviolet excited rare earth compound,

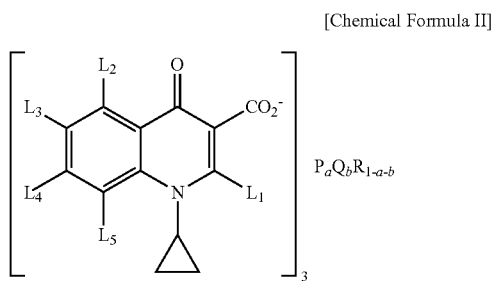

[Chemical Formula II]

where, P and Q are rare earth metals independently selected from Ce, Nd, Sm, Eu, Gd, Tb, La and Y, and where R is alkaline earth metal selected from (Ca), strontium and barium, and L 1, L 2, L 3, L 4 and L 5 are independently selected from hydrogen, C 1-8 aryl group, halogen group and C 1-8 alkoxy group, the a and b are respectively a real number greater than 0, and $0<a+b\leq1$.

In some exemplary embodiments, the composition may emit a red color at 360-380 nm range wavelength, and emit a red and green colors at 240-330 nm range wavelength.

In some exemplary embodiments, the composition may further comprise at least one fluorescent substance selected from Red 620 (CAS No. 1417311-00-2), Yellow 565 (CAS No. 28683-92-3), Green 555 (CAS No. 1466444-84-7), Green 550 (CAS No. 1151-84-4) and Blue-green 510 (CAS No. 1461703-41-2).

Advantageous Effects

The luminescent rare earth compound and/or products applied with the luminescent rare earth compound according to the present invention can emit strong red and green colors by being excited at 240-330 nm range of wavelengths, while not being excited at 360-380 nm range of wavelengths, and showing no colors under visible light.

Furthermore, the compound may be variably utilized to printed materials and plastic mold products because of possessing high heat resistance, high light resistance and high dispersibility of medium light. In addition, compositions emitting respectively different colors at mutually different wavelength ranges can be provided by mixing the luminescent rare earth compound according to the present invention with other excited luminescent compounds.

BEST MODES

In order to more easily understand the present invention, certain terms will be defined herein for the benefit of convenience. Unless otherwise defined, all terms including technical and scientific terms used herein have the same meaning as commonly understood by one of ordinary skill in the art to which this invention belongs. Furthermore, as used herein, the terms "a" and "an" are open terms that may be used in conjunction with singular items or with plural items. The terms of manufacturing (manufactured) and producing (produced) may be interchangeably used.

According to a general aspect, there is provided a luminescent rare earth compound having a structure of the following chemical formula I,

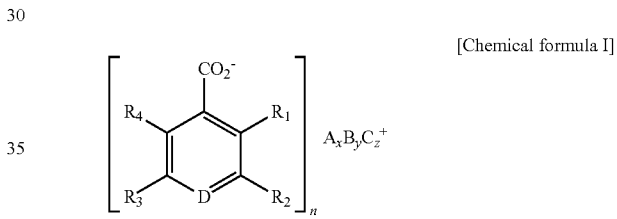

[Chemical formula I]

where, A and B are rare earth metals independently selected from Ce, Pr, Nd, Sm, Eu, Gd, Tb, Dy, Ho, Er and Tm, C is an amphoteric element selected from Al, Ga and In, each of R 1, R 2 and R 3 is independently carboxylate anion or H, and D is a nitrogen or carbon.

In some exemplary embodiments, the R 1 and R 4 are H, the R 2 and R 3 are carboxylate anion, the D is carbon and the A and B may be selected from Eu and Tb. The number of repeating unit of ligands corresponding to aromaticity ring in the Chemical formula I may be defined as n, and at this time, the number of repeating unit may be defined as satisfying the stoichiometry of n: $x+y+z=3/$[the number of negative electric charge in above chemical formula I]: 1.

In some exemplary embodiments, the compound may not be excited at a wavelength of 360-380 nm range and may be excited at a wavelength of 240-330 nm range. At this time, it is intended that the wavelength of 360-380 nm range may correspond to near ultraviolet area, and the wavelength of 240-330 nm range may correspond to ultraviolet area.

The luminescent rare earth compound can emit strong red and green colors by being excited at 240-330 nm range of wavelengths, while not being excited at 360-380 nm range of wavelengths.

Furthermore, although the compound may be a single compound having a same chemical formula, the compound may a mixture of a plural compound having mutually different chemical formulas, albeit having a structure of Chemical formula I.

However, it should be understood that, even if the luminescent rare earth compound may be a plural compound, the characteristic of emitting strong red and green colors by being excited at 240-330 nm range of wavelengths is maintained.

In another general aspect, there is provided a dichroism fluorescent composition comprising: the luminescent rare earth compound having a structure of the following chemical formula II, and including near ultraviolet excited rare earth compound,

[Chemical Formula II]

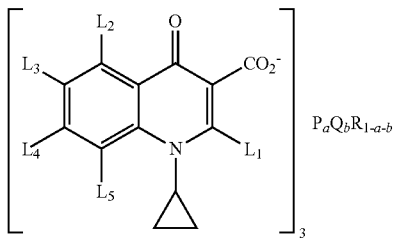

where, P and Q are rare earth metals independently selected from Ce, Nd, Sm, Eu, Gd, Tb, La and Y, and where R is alkaline earth metal selected from (Ca), strontium and barium, and L 1, L 2, L 3, L 4 and L 5 are independently selected from hydrogen, C 1-8 aryl group, halogen group and C 1-8 alkoxy group, the a and b are respectively a real number greater than 0, and 0<a+b≤1.

Here, the luminescent rare earth compound can emit strong red and green colors of visible ray wavelengths by being excited at 240-330 nm range of wavelengths, while not being excited at 360-380 nm range of wavelengths.

Meantime, the dichroism fluorescent composition can emit a strong red color of visible ray wavelength by not being excited at 240-330 nm range of wavelengths, while being excited at 360-380 nm range of wavelengths.

That is, the dichroism fluorescent composition may be so configured as to emit mutually different colors at long wavelengths and short wavelengths.

In some exemplary embodiments, the composition may further comprise at least one fluorescent substance selected from Red 620 (CAS No. 1417311-00-2), Yellow 565 (CAS No. 28683-92-3), Green 555 (CAS No. 1466444-84-7), Green 550 (CAS No. 1151-84-4) and Blue-green 510 (CAS No. 1461703-41-2).

The luminescent rare earth compound and the near ultraviolet excited rare earth compound may be manufactured by respectively reacting in water at least one rare earth metallic salt and the repeating unit indicated by the Chemical formula I and II.

The luminescent rare earth compound and the near ultraviolet excited rare earth compound may be generally product materials formed in sediments after the reaction, and may be used after being separated and dried by a method well known in the art.

In still another aspect of the present invention, the luminescent rare earth compound and/or the dichroism fluorescent composition may be a mixture mixed with plastic or high polymer synthetic resin. This composition may be a coating-purpose resin composition that is used for coating a product.

The coating-purpose resin composition may be manufactured by mixing the compound according to the present invention with at least one binder resin selected from acrylic polymer, polyurethane, polyester, polyethylene, polyethyleneterephthalate, polycarbonate and polypropylene, solvent and hardener.

Here, the solvent may be selected from halogenated hydrocarbon such as dichloromethane, chloroform, carbon tetrachloride, trichloroethane, dichloroethane, tetrachloromethane and dichlorofluoro ethane, for example, ether such as ethyl ether, propyl ether, butyl ether and cyclohexyl, for example, alcohol such as methanol, ethanol, propanol, tetrafluoroborate and butanol, for example, ketone such as acetone, trifluoroacetone, hexafluoroacetone and cyclohexanone, and hydrocarbon such as hexane, cyclohexane, methylcyclohexane, dimethylcyclohexane, octane and cyclooctane, for example.

The coating-purpose resin composition may be variably utilized by being coated on a surface of a product for red color luminescence by being irradiated with ultra violet. Although the compound according to the present invention in the coating-purpose resin composition may be contained in variable contents in response to usage, the compound may be preferable to be included with 1~10 part by weight relative to 100 part by weight of coating-purpose resin composition.

When quantity of composition is less than 1 part by weight, the luminescence effect in response to excitation may be insignificant, and when quantity of composition is more than 10 part by weight, there may be generated a problem of degraded transmittance due to luminescence compound. Furthermore, the present invention may be a film containing the rare earth metallic complex compound.

By way of example, the composition may be manufactured in a film type by laminating the composition included with the rare earth metallic complex compound on the polymer film under a high temperature. In addition, the film included with the compound according to the present invention may be variably manufactured by the well-known prior methods.

By way of example, in the process of manufacturing a master batch by extrusion molding after fusion of resin, when the compound according to the present invention is mixed to the resin, the master batch is made by extrusion molding through fusion of resin thus mixed, and fused and formed using the conventional method, various shapes of products including the film can be manufactured.

Hereinafter, the present invention will be described in more detail through exemplary embodiments. However, these exemplary embodiments are provided only for exemplification, and the scope of invention is not interpreted as limiting these exemplary embodiments.

First Exemplary Embodiment: Composition of Eu 0.6 Y 0.4 (Benzoic Acid) 3

13.7 g of benzoic acid (C 6 H 5 COOH Mw. 122.12, Samchun Chemical Co.) was suspended in a water of 150 ml within a 500 ml round bottom flask, and 4.5 g of sodium hydroxide (NaOH Mw. 40, Samchun Chemical Co.) was added and dissolved. A solution was obtained by dissolving 3.95 g of europium oxide (Eu 2 O 3 Mw. 351.926) and 1.69 g of yttrium oxide(Y 2 O 3 Mw. 225.81) in 12 g of 35% hydrochloric acid and 80 ml of water, and the obtained solution was agitated for 30 minutes and dropped under 10-100° C.

Then, the sediment-removed europium-yttrium complex compound was separated and dried, whereby no excitation was made at 360-380 nm range, and strong red fluorescence was shown at 240 nm to 330 nm wavelengths.

Second Exemplary Embodiment: Composition of Eu 0.6 Y 0.4 (Isophthalic Acid) 1.5

10 g of isophthalic acid (C 6 H 4 (COOH) 2 Mw. 166.14, TCI) was suspended in a 150 ml-water within a 500 ml round bottom flask, and added with 4.8 g of sodium hydroxide (NaOH Mw. 40, Samchun Chemical Co.) and dissolved. A solution was obtained by dissolving 2.71 g of europium oxide (Eu 2 O 3 Mw. 351.926) and 2.71 g of yttrium oxide(Y 2 O 3 Mw. 225.81) in 12.5 g of 35% hydrochloric acid and 80 ml of water, and the obtained solution was agitated for 30 minutes and dropped under 10-100° C.

Then, the sediment-removed europium-yttrium complex compound was separated and dried, whereby no excitation was made at 360-380 nm range, and strong red fluorescence was shown at 240 nm to 330 nm wavelengths.

Third Exemplary Embodiment: Composition of Eu 0.2 Y 0.8 (1,3,5-Benzene-Tricarboxylic Acid) 1

10.5 g of 1,3,5,-Benzenetricarboxylic acid (C 6 H 3 (COOH) 3 Mw. 210.14, TCI) was suspended in 150 ml water within a 500 ml round bottom flask, and added with 6 g of sodium hydroxide (NaOH Mw. 40, Samchun Chemical Co.) and dissolved.

A solution was obtained by dissolving 1.76 g of europium oxide (Eu 2 O 3 Mw. 351.926) and 4.52 g of yttrium oxide(Y 2 O 3 Mw. 225.81) in 15.5 g of 35% hydrochloric acid and 80 ml of water, and the obtained solution was agitated for 30 minutes and dropped under 10-100° C.

Then, the sediment-removed europium-yttrium complex compound was separated and dried, whereby no excitation was made at 360-380 nm range, and strong red fluorescence was shown at 240 nm to 330 nm wavelengths.

Fourth Exemplary Embodiment: Composition of Tb 0.2 Y 0.8 (1,3,5-Benzene-Tricarboxylic Acid) 1

14.2 g of 1,3,5,-Benzenetricarboxylic acid (C 6 H 3 (COOH) 3 Mw. 210.14, TCI) was suspended in 150 ml water within a 500 ml round bottom flask, and added with 8.2 g of sodium hydroxide (NaOH Mw. 40, Samchun Chemical Co.) and dissolved.

A solution was obtained by dissolving 4.8 g of (TbCl$_3$6H$_2$O Mw. 373.38) and 5.7 g of yttrium oxide (Y 2 O 3 Mw. 225.81) in 15.7 g of 35% hydrochloric acid and 80 ml of water, and the obtained solution was agitated for 30 minutes and dropped under 10-100° C.

Then, the sediment-removed terbium-yttrium complex compound was separated and dried, whereby no excitation was made at 360-380 nm range, and strong red fluorescence was shown at 240 nm to 330 nm wavelengths.

Fifth Exemplary Embodiment: Composition of Eu 0.5 Y 0.5 (1,2,4,5-Benzene-Tetracarboxylic Acid) 0.75

9.5 g of 1,2,4,5-benzenetetracarboxylic acid (C 6 H 2 (COOH) 4 Mw. 254.15, TCI) was suspended in 150 ml water within a 500 ml round bottom flask, and added with 6 g of sodium hydroxide (NaOH Mw. 40, Samchun Chemical Co.) and dissolved.

A solution was obtained by dissolving 4.4 g of europium oxide (Eu 2 O 3 Mw. 351.926) and 2.8 g of yttrium oxide (Y 2 O 3 Mw. 225.81) in 15.5 g of 35% hydrochloric acid and 80 ml of water, and the obtained solution was agitated for 30 minutes and dropped under 10-100° C.

Then, the sediment-removed europium-yttrium complex compound was separated and dried, whereby no excitation was made at 360-380 nm range, and strong red fluorescence was shown at 240 nm to 330 nm wavelengths.

Sixth Exemplary Embodiment: Composition of Eu(Pyridine-2-Carboxylic Acid) 3

13.8 g of pyridine-2-carboxylic acid (C 6 H 5 NO 2 Mw. 123.11, Alfa aesar) was suspended in 150 ml water within a 500 ml round bottom flask, and added with 4.5 g of sodium hydroxide (NaOH Mw. 40, Samchun Chemical Co.) and dissolved.

A solution was obtained by dissolving 6.6 g of europium oxide (Eu 2 O 3 Mw. 351.926) in 11.3 g of 35% hydrochloric acid and 80 ml of water, and the obtained solution was agitated for 30 minutes and dropped under 10-100° C.

Then, the sediment-removed europium complex compound was separated and dried, whereby no excitation was made at 360-380 nm range, and strong red fluorescence was shown at 240 nm to 330 nm wavelengths.

Seventh Exemplary Embodiment: Composition of Eu(Pyridine-4-Carboxylic Acid) 3

13.8 g of pyridine-2-carboxylic acid (C 6 H 5 NO 2 Mw. 123.11, Alfa aesar) was suspended in 150 ml water within a 500 ml round bottom flask, and added with 4.5 g of sodium hydroxide (NaOH Mw. 40, Samchun Chemical Co.) and dissolved.

A solution was obtained by dissolving 6.6 g of europium oxide (Eu 2 O 3 Mw. 351.926) in 11.3 g of 35% hydrochloric acid and 80 ml of water, and the obtained solution was agitated for 30 minutes and dropped under 10-100° C.

Then, the sediment-removed europium complex compound was separated and dried, whereby no excitation was made at 360-380 nm range, and strong red fluorescence was shown at 240 nm to 330 nm wavelengths.

Eighth Exemplary Embodiment: Composition of Eu 0.6 Y 0.4 (2,5-Pyridinedicarboxylic Acid) 1.5

12.5 g of 2,5-pyridine dicarboxylic acid (C 7 H 5 NO 4 Mw. 167.12, TCI) 12.5 g was suspended in 150 ml water within a 500 ml round bottom flask, and added with 6 g of sodium hydroxide (NaOH Mw. 40, Samchun Chemical Co.) and dissolved.

A solution was obtained by dissolving 5.25 g of europium oxide (Eu 2 O 3 Mw. 351.926) and 2.25 g of yttrium oxide (Y 2 O 3 Mw. 225.81) in 15.6 g of 35% hydrochloric acid and 80 ml of water, and the obtained solution was agitated for 30 minutes and dropped under 10-100° C.

Then, the sediment-removed europium-yttrium complex compound was separated and dried, whereby no excitation was made at 360-380 nm range, and strong red fluorescence was shown at 240 nm to 330 nm wavelengths.

Ninth Exemplary Embodiment

Offset ink of 20 weight % was manufactured by mixing the red shortwave fluorescent substance composed by the third exemplary embodiment of the present invention with yellow 565 of Nano CMS Company.

Tenth Exemplary Embodiment

Offset ink of 20 weight % was manufactured by mixing the red shortwave fluorescent substance composed by the third exemplary embodiment of the present invention with green 550 of Nano CMS Company.

Eleventh Exemplary Embodiment

Offset ink of 20 weight % was manufactured by mixing green shortwave fluorescent substance composed by the fourth exemplary embodiment of the present invention with red near ultraviolet complex compound of [structural formula 2] based on KR 10-12129.

Excitation and luminescent brightness were measured from powder sample manufactured and obtained by the exemplary embodiments 1-8 using PL/PLE Measurement System (PSI 1100) and the measured result is shown in the following Table 1. The luminescent characteristic at 305 nm obtained by transferring the offset ink manufactured and obtained from the exemplary embodiments 9-11 on non-fluorescent paper is shown in Table 2, and the luminescent characteristic at 365 nm is shown in Table 3.

TABLE 1

| Classification | Maximum excitation wavelength (nm) | color coordinate (CIEx) | color coordinate (CIEy) | Maximum luminescent wavelength (nm) |
|---|---|---|---|---|
| First exemplary embodiment | 293 | 0.6725 | 0.3272 | 620 |
| Second exemplary embodiment | 299 | 0.6795 | 0.3203 | 622 |
| Third exemplary embodiment | 310 | 0.6690 | 0.3308 | 616 |
| Fourth exemplary embodiment | 310 | 0.3465 | 0.6144 | 554 |
| Fifth exemplary embodiment | 299 | 0.6746 | 0.3252 | 616 |
| Sixth exemplary embodiment | 285 | 0.6706 | 0.3292 | 622 |
| Seventh exemplary embodiment | 304 | 0.6743 | 0.3254 | 622 |
| Eighth exemplary embodiment | 301 | 0.6789 | 0.3209 | 618 |

TABLE 2

| Classification | color coordinate (CIEx) | color coordinate (CIEy) | Maximum luminescent wavelength (nm) |
|---|---|---|---|
| Ninth exemplary embodiment | 0.5059 | 0.4685 | 616 |
| Tenth exemplary embodiment | 0.4518 | 0.4874 | 616 |
| Eleventh exemplary embodiment | 0.4048 | 0.5630 | 554 |

TABLE 3

| Classification | color coordinate (CIEx) | color coordinate (CIEy) | Maximum luminescent wavelength (nm) |
|---|---|---|---|
| Ninth exemplary embodiment | 0.4229 | 0.5329 | 545.6 |
| Tenth exemplary embodiment | 0.3149 | 0.5823 | 515.6 |
| Eleventh exemplary embodiment | 0.4266 | 0.5396 | 544.6 |

Although the foregoing has explained the exemplary embodiment of the present invention, the present invention is not always limited to the given exemplary embodiments. The above disclosed subject matter is to be considered illustrative, and not restrictive, and the appended claims are intended to cover all such modifications, enhancements, and other embodiments which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

INDUSTRIAL APPLICABILITY

The luminescent rare earth compound and/or products applied with the luminescent rare earth compound according to the present invention can emit strong red and green colors by being excited at 240-330 nm range of wavelengths, while not being excited at 360-380 nm range of wavelengths, and showing no colors under visible light.

Furthermore, the compound may be variably utilized to printed materials and plastic mold products because of possessing high heat resistance, high light resistance and high dispersibility of medium light.

The invention claimed is:

1. A luminescent rare earth compound consisting of:
   $Eu_{0.6}Y_{0.4}$(Benzoic acid)$_3$, or
   $Eu_{0.5}Y_{0.5}$(1,2,4,5-Benzene-tetracarboxylic acid)$_{0.75}$.

2. The luminescent rare earth compound of claim 1, wherein the compound is not excited at a wavelength of 360-380 nm range and is excited at a wavelength of 240-330 nm range.

3. The luminescent rare earth compound of claim 1, wherein the compound emits red and green colors.

4. A dichroism fluorescent composition comprising:
   a luminescent rare earth compound comprising $Eu_{0.6}Y_{0.4}$(Benzoic acid)$_3$, $Eu_{0.2}Y_{0.8}$(1,3,5-Benzene-tricarboxylic acid)$_1$, $Eu_{0.5}Y_{0.5}$(1,2,4,5-Benzene-tetracarboxylic acid)$_{0.75}$, Eu(Pyridine-2-carboxylic acid)$_3$, or Eu(Pyridine-4-carboxylic acid)$_3$; and
   near ultraviolet excited rare earth compound having a structure of the following chemical formula II,

[Chemical Formula II]

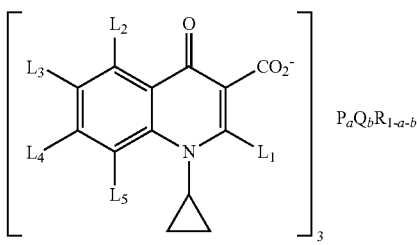

where, P and Q are rare earth metals independently selected from Ce, Nd, Sm, Eu, Gd, Tb, La and Y, and where R is alkaline earth metal selected from Ca (Calcium), Sr (strontium), and Ba (barium), and L 1, L 2, L 3, L 4 and L 5 are independently selected from hydrogen, C 1-8 aryl group, halogen group and C 1-8 alkoxy group, the a and b are respectively a real number greater than 0, and 0<a+b≤1.

5. The dichroism fluorescent composition of claim 4, wherein the composition emits a red color when excited with light at 360-380 nm range wavelength, and emits red and green colors when excited with light at 240-330 nm range wavelength.

6. The dichroism fluorescent composition of claim 4, wherein the composition further comprises at least one fluorescent substance selected from Red 620 (CAS No. 1417311-00-2), Yellow 565 (CAS No. 28683-92-3), Green 555 (CAS No. 1466444-84-7), Green 550 (CAS No. 1151-84-4), or Blue-green 510 (CAS No. 1461703-41-2).

\* \* \* \* \*